R. A. WHITESIDE.
FASTENING DEVICE.
APPLICATION FILED SEPT. 29, 1914.
1,203,669.
Patented Nov. 7, 1916.
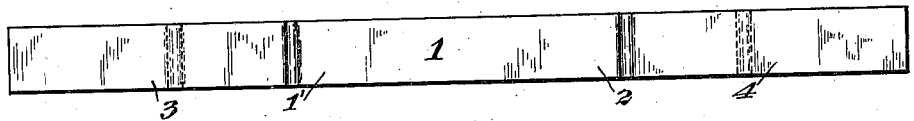
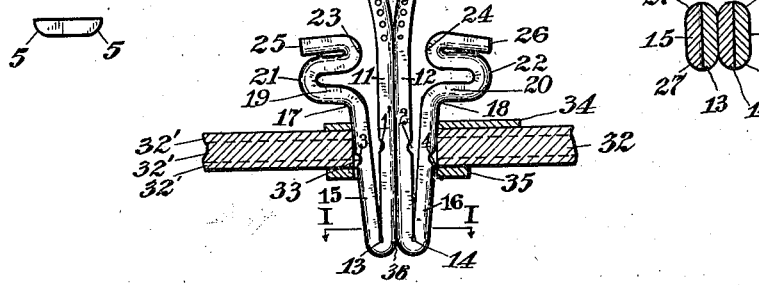
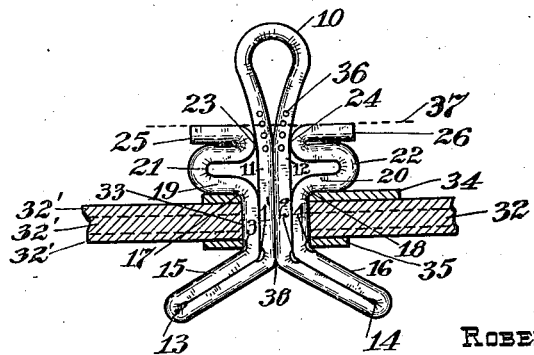
ROBERT A. WHITESIDE.
*INVENTOR.*
WITNESSES:
BY
*ATTORNEY.*

UNITED STATES PATENT OFFICE.

ROBERT A. WHITESIDE, OF BEAVER FALLS, PENNSYLVANIA, ASSIGNOR OF ONE-HALF TO ALEXANDER M. NEEPER, OF PITTSBURGH, PENNSYLVANIA.

FASTENING DEVICE.

1,203,669.　　　　　　Specification of Letters Patent.　　Patented Nov. 7, 1916.

Application filed September 29, 1914. Serial No. 864,079.

*To all whom it may concern:*

Be it known that I, ROBERT A. WHITESIDE, a citizen of the United States, residing in Beaver Falls, county of Beaver, and State of Pennsylvania, have invented new and useful Improvements in Fastening Devices, of which the following is a specification.

This invention relates to improvements in fastening devices made from elastic, ductile material.

Among the principal objects of this invention are the following: to produce a fastening device which when driven, by the action of being driven, automatically clenches itself on material fastened thereby— said device being provided with means which control the extent of the bending of its parts to effectuate its clenching.

My invention consists of a fastening device made of elastic, ductile material, hereinafter described, and the means embodied therein for the purpose of facilitating and controlling the performance of its functions.

In the accompanying drawing forming part of this specification, Figure 1 is a plan view of the blank used to make the fastening device; Fig. 2 is an edge view thereof; Figs. 3, 4, 5, illustrate forms of the modification of the cross-section of blank shown in Fig. 1; Figs. 6 and 7 are views of washers used in connection with the fastening device; Fig. 8 is a side elevation of the fastening device inserted in an object before the same is driven and clenched; Fig. 9 is a view of the device driven and clenched through objects to be fastened thereby; Fig. 10 is an end view of the blank shown in Fig. 1; Fig. 11 is a cross-section of Fig. 8 on section line I—I.

Like figures of reference refer to like parts throughout.

In Fig. 1, 1 is a bar of elastic, ductile material, for example of steel, having grooves 1' and 2 in one side thereof and grooves 3 and 4 in the opposite side thereof, and having rounded edges 5—5, as shown in Fig. 10, although said blank may be used with square edges. The grooves 1', 2, 3 and 4 of Fig. 1 are made therein for the purpose of controlling and facilitating the bending of the ends of the fastening device as hereinafter described. Said grooves or displacement or modification of the distribution of the material of bar 1, or the equivalent thereof, are means by which the bending of the ends of the fastening device is controlled, so as to clench the same as hereinafter described. Said grooves may be substituted by a distinct bend in bar 1, made by a die or forging press, as shown at 7 in Fig. 3, or by a bulge shown by the striking of a blunt instrument at 8 in Fig. 5, or by a shallow groove 9 as shown in Fig. 4. Any manipulation of the cross-section of bar 1 which reduces the same or makes the bar at the point of such manipulation more susceptible to bending may be used as the means of controlling and facilitating the spread of the ends of the fastening device as aforesaid.

Bar 1 is bent so as to form therein, substantially at its medial transverse axis, a semi-circular part 10 in said bar, from which extend parts 11 and 12, which are parallel for the greater part of their lengths and are hereinafter referred to as "inner parallel members" of the fastening device described herein. Said bar 1 is bent at 13 and 14 Fig. 8, and those parts of bar 1, 15 and 16, extending from bends 13 and 14 to the ends of said bar 1, form the remaining members of the fastening device which are hereinafter referred to as "outer terminal members." Said outer terminal members 15 and 16 are bent respectively at bends 17 and 18, so as to form therein outwardly extending parts 19 and 20. Bends 17 and 21 and 18 and 22, respectively, are connected by parts 19 and 20, respectively. Bends 23 and 24 are formed as shown in Fig. 8 between bends 21 and 22 and ends 25 and 26 of bar 1.

Bends 17 and 18 and connecting parts 19 and 20 of outer terminal members 15 and 16, respectively, or their equivalents, are essential as forming the means of preventing the fastening device from passing through the perforation into which it is inserted, when it is driven for the purpose of spreading its ends, terminating in bends 13 and 14. Bends 21, 22, 23 and 24 are formed as shown in Fig. 8 to give spring and resiliency to the fastening device and are convenient for that purpose, but not strictly essential to the fastening device clenching itself when driven and firmly holding together objects into which said fastening device is driven for the purpose of fastening them together.

Fig. 11 is a cross-section to Fig. 8 on section line I—I and shows the outer terminal members 15 and 16 rounded at 27, 27, 27, 27. This rounding of the corners of said outer terminal members is not essential but is convenient when said fastening device is inserted in a round hole to permit it to rotate therein, if such rotation be desirable or necessary, otherwise said round edges 27 might be formed as a square edge.

In Fig. 6, 28 is a washer having a hole 29, substantially rectangular in shape with round corners.

In Fig. 7, 30 is a washer, shown in said figure as a circular washer, which may be of any convenient shape provided it has a rectangular hole 31.

In Fig. 8, 32 is an object into which the fastening device may be inserted and driven, which has a perforation 33. It may be a single object, or for the purpose of description and claiming my present invention may consist of three separate objects 32', 32', 32', each of these objects may be of metal or wood or elastic material of different degrees of resiliency and semi-plasticity.

34 is a washer which may be of the shape of washer 28 or washer 30. 35 is a like washer, each provided with a substantially rectangular perforation.

When bar 1 has been bent as hereinbefore described so that the fastening device is of the form shown in Fig. 8, grooves 1', 2, 3 and 4 are substantially in the position with reference to objects 32 and washers 34 and 35, if washers be used, as shown in Fig. 8, when said fastening device is inserted in the perforation of said washers and objects before the same is driven for the purpose of spreading its ends, terminating in bends 13 and 14 and clenching said device in the driven position.

36, 36, etc., are punch marks or marks of any convenient form placed on the edge of bar 1, as shown in Fig. 8. These marks furnish a guide for driving the inner parallel members of the fastening device, when used in connection with an imaginary line in a plane passing through the top edges of ends 25 and 26 of bar 1, said line being dotted in Fig. 9 and marked 37.

Fig. 9 shows the relative position of all of the parts hereinbefore referred to of said fastening device when the same has been driven.

The fastening device having been inserted in the object or objects into which it is driven, and through the washers, if washers are used, as shown in Fig. 8, the inner parallel members thereof are driven by force applied to semi-circular part 10, and the outer terminal members are held at 17 and 18 on top of 34 while said force is being applied. The result of the movement of the inner parallel members responding to said applied force is that both the inner parallel members and outer terminal members are bent so as to separate from each other, as shown in Fig. 9, and to form an obtuse angle 38. The grooves 3 and 4 locating themselves substantially at the under surface of washer 35, and the grooves 1' and 2 facilitating and magnifying the flexure of said parts along substantially radial lines extending from the inner lower edges of the opening in washer 35 through substantially the central points of said grooves 1', 2, 3 and 4. The result of the spreading of the members of the fastening device is that the object or objects into which the same is driven are held firmly between the top sides of the spread and protruding members of the device and the bottom sides of parts 19 and 20 of the outer terminal members of the device.

Before the fastening device is driven, members 11 and 12 are slightly inclined to members 15 and 16, respectively, as shown in Fig. 8. When the fastening device is driven parts of members 11 and 12 and 15 and 16 are forced into contact with each other as shown in Fig. 9, and those parts of members 11 and 12 connected by semi-circular part 10, which are located between the extremities of semi-circular part 10 and the parallel parts of 11 and 12, are inclined to one another and act as a wedge between bends 23 and 24, separating and bringing into tension those parts of the outer terminal members between connecting parts 19 and 20 and ends 25 and 26 thereof. The wedge thus formed by parts of members 11 and 12, the protruding ends of 11 and 12 and 15 and 16 driven through the object to be fastened, and the ends of 15 and 16 between 19 and 25 and 20 and 26 respectively, coöperate to form an elastic fastening which can be advantageously used in many mechanical operations.

The device may be removed after having been driven, and after having been straightened to a substantially normal form may be again driven with the similar results as to the spread and protruding ends thereof until the fiber of the material thereof breaks down.

While grooves 1', 2, 3 and 4 facilitate and to a large degree control the spreading of the ends of the fastening device, a fastening device made without said grooves or their equivalents for such control and facilitation of bending, will, when driven, automatically spread its ends in a similar manner to that of a fastening device furnished with said grooves or their equivalents, but possibly to a less degree of bending; such device would be of the form of the device shown in Fig. 8, the grooves 1', 2, 3 and 4 being absent therefrom and the cross-section of bar 1 in such device being the same throughout its entire length.

While I have shown the means for facilitating and controlling the bending of the driven ends of the fastening device as grooves 1', 2, 3 and 4, there may, in practice, be additional grooves used and embodied in the blanks for making fastening devices according to my invention and in said fastening devices themselves. If, for example, additional grooves were made between 1' and 13 and 2 and 14 and between 13 and 3 and between 14 and 4, if a sufficient number were used, the protruding driven ends of the fastening device when driven would assume a position parallel to the bottom of 32, or if a sufficient number of grooves were placed in such position, would assume a semi-circular shape with the bends 13 and 14 in contact with the bottom of 32. I, therefore, do not wish to be limited in my claims or the scope of my invention to the use of the four grooves specially numbered on the drawing or their equivalents, but to be privileged to use as many grooves or their equivalents as the special use or application of my invention from time to time may require.

What I claim as my invention is:

1. A fastening device bent medially to form parallel members and said parallel members then bent back on themselves to form approximately parallel inner and outer members, said inner and outer members being weakened on their outer sides at approximately corresponding points intermediate their ends to define bending points.

2. A fastening device bent medially to form approximately parallel members connected at one end by a semi-circular bend and said parallel members then bent back upon themselves to form approximately parallel inner and outer members, said inner and outer members being weakened at approximately corresponding points intermediate their ends to define bending points; said outer members being bent approximately at their ends to form outwardly extending bends therein.

3. A fastening device bent medially and then bent back upon itself to form therein approximately parallel inner members and outer terminal members, the parallel parts of which, adjacent to the bends connecting them, constitute the spreading ends of said device, said outer and inner members being formed, at approximately corresponding points intermediate their ends, for controlling and facilitating the spreading of said spreading ends.

4. A fastening device bent medially and then bent back upon itself to form therein approximately parallel inner members and outer terminal members, the parallel parts of which, adjacent to the bends connecting them, constitute the spreading ends of said device, said outer and inner members being formed, at approximately corresponding points intermediate their ends, for controlling and facilitating the spreading of said spreading ends, said outer terminal members being provided, approximately at their ends, with means integral therewith for preventing said device from passing through objects into which said device is driven.

5. A fastening device bent medially to form a semi-circular bend at its medial part, and members inclined in part and parallel in part; said members being bent back upon themselves to form inner and outer members, said outer members being inclined, said outer members bent approximately at their ends to form outwardly extending parts therein; said outer and inner members being weakened at approximately corresponding points intermedate their ends to define bending points.

6. A fastening device bent medially and again bent back upon itself and again bent adjacent to each of its ends so as to form therein (a) a semi-circular bend; (b) inner members consisting of that part thereof between the ends of said semi-circular bend and the bends at the point at which said device is bent back upon itself; (c) outer members consisting of the remainder of said device between said last mentioned bends and the ends thereof; and (d) bends in said outer members adjacent to their respective ends; said inner and outer members being weakened on their outer sides at approximately corresponding points intermediate their ends to define bending points of the connected ends of said inner and outer members.

In witness whereof I have hereunto subscribed my name in the presence of two subscribing witnesses.

ROBERT A. WHITESIDE.

Witnesses:
A. M. NEEPER,
JAMES F. CALLAHAN.